United States Patent [19]
Frink

[11] Patent Number: 6,134,607
[45] Date of Patent: Oct. 17, 2000

[54] METHOD AND APPARATUS FOR CONTROLLING DATA FLOW BETWEEN DEVICES CONNECTED BY A MEMORY

[75] Inventor: Craig R. Frink, Chelmsford, Mass.

[73] Assignee: Avid Technology, Inc., Tewksbury, Mass.

[21] Appl. No.: 09/055,017

[22] Filed: Apr. 3, 1998

[51] Int. Cl.⁷ .................................................. G06F 13/14
[52] U.S. Cl. .............................. 710/22; 710/52; 710/57; 710/34; 710/29; 709/216
[58] Field of Search .................... 710/22, 29, 52, 710/57, 34, 216; 709/216

[56] References Cited

U.S. PATENT DOCUMENTS

| | | | |
|---|---|---|---|
| 4,491,909 | 1/1985 | Shimizu . | |
| 5,068,785 | 11/1991 | Sugiyama | 395/325 |
| 5,093,780 | 3/1992 | Sunahara | 395/800 |
| 5,455,913 | 10/1995 | Shrock et al. | 395/280 |
| 5,473,756 | 12/1995 | Traylor | 710/57 |
| 5,511,165 | 4/1996 | Brady et al. | 709/216 |
| 5,584,010 | 12/1996 | Kawai et al. | 395/444 |
| 5,604,866 | 2/1997 | Kolb | 709/235 |
| 5,664,104 | 9/1997 | Shinjo et al. | 709/224 |

FOREIGN PATENT DOCUMENTS

| | | |
|---|---|---|
| 0 242 634 A2 | 10/1987 | European Pat. Off. . |
| 0 393 319 A2 | 10/1990 | European Pat. Off. . |
| 2 440 058 A1 | 5/1980 | France . |
| WO 98/13767 | 4/1998 | WIPO . |

*Primary Examiner*—Thomas C. Lee
*Assistant Examiner*—Abdelmoniem Slamm
*Attorney, Agent, or Firm*—Wolf, Greenfield & Sacks, P.C.

[57] ABSTRACT

A memory is used as a data buffer and switch between devices producing and consuming data in combination with a separate control channel which conveys flow control information between the devices connected through the memory. The control channel includes a signal sent from a sender to a receiver granting the receiver permission to read data from the memory. The receiver replies with a signal indicating that data has been read from the memory, permitting the sender to write data to the memory. The memory is considered a circular buffer by the sender. The sender writes data into the memory at sequential locations until the end of the circular buffer is reached. This end of the buffer may be represented by a limit pointer. When data is written to the memory, the sender indicates the amount of valid data in the memory in a signal to the receiver over the control channel. The receiver receives this signal and reads data from the memory up to and limited by the amount indicated by the sender. The amount of data read by the receiver from the memory is sent by the receiver in a reply to the sender through the separate control channel. The sender cannot overwrite the memory until the receiver indicates that the data has been read out of the memory. The reply received by the sender is used to advance a limit pointer which indicates the end of the circular buffer. This control channel reduces transfer latency incurred by managing memory coherency in applications with irregular rates of either sending or receiving data which may result from using controlled flow interconnect protocols. The control channel also may be used to communicate auxiliary information such as switching or other packet flow control information between connected devices. This auxiliary information may include the start address of a data buffer and memory, the buffer size and configuration, and an address of a destination device for the data.

10 Claims, 3 Drawing Sheets

METHOD AND APPARATUS FOR CONTROLLING DATA FLOW BETWEEN DEVICES CONNECTED BY A MEMORY

FIELD OF THE INVENTION

The present invention is related to controlling data flow between interconnected devices, particularly video devices interconnected by a memory.

BACKGROUND

Analog motion video signals, such as those used in common television sets, video tape recorders and other analog video systems, are temporally continuous and synchronous signals requiring various elements in a video system to be synchronized in order to be used. In other words, analog motion video signals have a predetermined and fixed rate to which all of the elements in the video system are synchronized. Any element in the video system is designed with the assumption that there will be a constant rate for input and output of motion video information.

More recently, it has been possible to store digital motion video data in data files on a computer. There are several methods for playing back such motion video data. One method is called "pushing" or "streaming" of the motion video data. Streaming is based on an assumption that a system can provide an average data flow rate that is the same as the ultimate data flow rate needed to ensure temporally continuous output of analog motion video images to a viewer. Sufficient buffering is used to account for expected latencies in data transfer between elements. In some cases, both the temporal and spatial resolution of the motion video information may need to be reduced. Such systems typically are designed with the assumption that transfer of audio and video data from a source through several processing elements to its ultimate destination can neither be delayed nor stopped.

When a general purpose digital computer is used to process motion video information, a constant rate of flow of data generally cannot be maintained. There may be variations in data flow rates due to various latencies in the computer system due to, for example, disk or memory read latency, interrupts from other processing elements in the computer, etc. In addition, in some systems, such as editing systems, the ability to stop and restart playback is desirable. In order to overcome such problems, one method which has been used is to provide sufficient buffering in combination with an ability for data transfer to be stalled, such as shown in U.S. Pat. No. 5,045,940 (Peters, et al.) which is hereby incorporated by reference. These principles are used in a computer network as described in published European Patent Application No. 0674414A2. An extension of this combination to special effects processing is disclosed in PCT Publications WO94/24815 and WO95/26100 which are incorporated by reference. In this system, a data decompressor outputs data into a first buffer, from which it is transferred to a second buffer associated with a special effects processor. The first buffer indicates whether valid data is available. In addition, the special effects processor indicates to a controller associated with the decompressor whether it can receive data based on memory in the second buffer.

One drawback of these systems is that they use a significant amount of buffering to accommodate for delays in data transfer between elements. In addition, they generally are designed for use with a single predetermined format of media. Such data processing devices also generally communicate data over an interconnect using a direct connection over signal lines or a transport medium. However, the interconnects between some data processing devices are implemented by sharing memory between devices which does not provide signals supporting such control. These devices also generally are designed with an assumption that data is received sequentially according to a predetermined conventional order.

SUMMARY

A memory is used as a data buffer and switch between devices producing and consuming data in combination with a separate control channel which conveys flow control information between the devices connected through the memory. The control channel includes a signal sent from a sender to a receiver granting the receiver permission to read data from the memory. The receiver replies with a signal indicating that data has been read from the memory, permitting the sender to write data to the memory.

The memory may be considered a circular buffer by the sender. The memory also may be a double buffer, or any other memory. The sender writes data into the memory at sequential locations until the end of the circular buffer is reached. This end of the buffer may be represented by a limit pointer. When data is written to the memory, the sender indicates the amount of valid data in the memory in a signal to the receiver over the control channel. The receiver receives this signal and reads data from the memory up to and limited by the amount indicated by the sender. The amount of data read by the receiver from the memory is sent by the receiver in a reply to the sender through the separate control channel. The sender cannot overwrite the memory until the receiver indicates that the data has been read out of the memory. The reply received by the sender is used to advance a limit pointer which indicates the end of the circular buffer.

This control channel reduces transfer latency incurred by managing memory coherency in applications with irregular rates of either sending or receiving data which may result from using controlled flow interconnect protocols.

The control channel also may be used to communicate auxiliary information such as switching or other packet flow control information between connected devices. This auxiliary information may include the start address of a data buffer and memory, the buffer size and configuration, and an address of a destination device for the data.

Accordingly, one aspect is an apparatus for communicating data between a first device and a second device. The first device has a first memory controller which writes data into a memory. The second device has a second memory controller which reads data from the memory. A control channel communicates from the first device to the second device an indication of an amount of data written into the memory by the first memory controller. The control channel also communicates from the second device to the first device an indication of the amount of data read from the memory by the second memory controller. The second memory controller reads data from the memory until the memory is empty as determined by the indicated amount of data written to the memory by the first memory controller and the amount of data read from the memory by the second memory controller. In one embodiment, writing of data to the memory by the other device is enabled unless the memory is determined by the other device to be full.

In another aspect, a device for receiving data from another device through a memory includes a memory controller for reading data from the memory. A control channel receives from the other device an indication of an amount of data written into the memory by the other device and communicates to the other device an indication of the amount of data read from the memory by the memory controller. The memory controller reads data from the memory until the memory is empty as determined by the indicated amount of data written to the memory by the other device and the amount of data read from the memory by the memory controller. In one embodiment, writing of data to the memory by the other device is enabled unless the memory is determined by the other device to be full.

In another aspect, a method for a device for controlling flow of data received from another device through a memory involves receiving from the other device an indication of an amount of data written into the memory by the other device. The device determines whether the memory is empty from the indicated amount of data written to the memory by the other device and an amount of data read from the memory. Reading of data from the memory is enabled unless the memory is determined to be empty. An indication of the amount of data read from the memory is communicated to the other device. In one embodiment, writing of data to the memory by the other device is enabled unless the memory is determined by the other device to be full.

In another aspect a device for communicating data to another device through a memory includes a memory controller which writes data into the memory. A control channel communicates to the other device an indication of an amount of data written into the memory by the memory controller and receives from the other device an indication of any amount of data read from the memory by the other device. The memory controller writes data to the memory until the memory is full as determined by the indicated amount of data written to the memory by the memory controller and the amount of data read from the memory by the other device.

In another aspect, a method for a device for controlling flow of data communicated to another device through a memory involves receiving from the other device an indication of an amount of data read from the memory by the other device. The device determines whether the memory is full from the indicated amount of data read from the memory by the other device and an amount of data written to the memory. Writing of data to the memory is enabled unless the memory is determined to be empty. An indication of the amount of data written to the memory is communicated to the other device.

In one embodiment, a third device having a third memory controller is connected to write data to the memory. A second control channel is used to communicate from the third device to the second device an indication of an amount of data written into the memory by the third memory controller. The second control channel also communicates from the second device to the third device an indication of the amount of data read from the memory by the second memory controller. The first device and the third device write data to separate portions of the memory. The second memory controller reads data from the memory for the third device until the memory for the third device is empty as determined by the indicated amount of data written to the memory by the third memory controller and the amount of data read from the memory for the third device by the second memory controller. The third memory controller writes data to the memory until the memory for the third device is full as determined by the indicated amount of data written to the memory by the third memory controller and the amount of data read from the memory for the third device by the second memory controller.

In another embodiment, a third device having a third memory controller is connected to read data to the memory. A second control channel is used to communicate from the first device to the third device an indication of an amount of data written into the memory by the first memory controller. The second control channel also communicates from the third device to the first device an indication of the amount of data read from the memory by the third memory controller. The second device and the third device read data from separate portions of the memory. The third memory controller reads data from the memory for the third device until the memory for the third device is empty as determined by the indicated amount of data written to the memory for the third device by the first memory controller and the amount of data read from the memory for the third device by the third memory controller. The first memory controller writes data to the memory until the memory for the third device is fall as determined by the indicated amount of data written to the memory by the first memory controller and the amount of data read from the memory for the third device by the third memory controller.

The provision of the control channel to transmit the amounts of data read and written into the device enables either device connected to the memory to control data flow through the memory.

DETAILED DESCRIPTION

Figure 1:
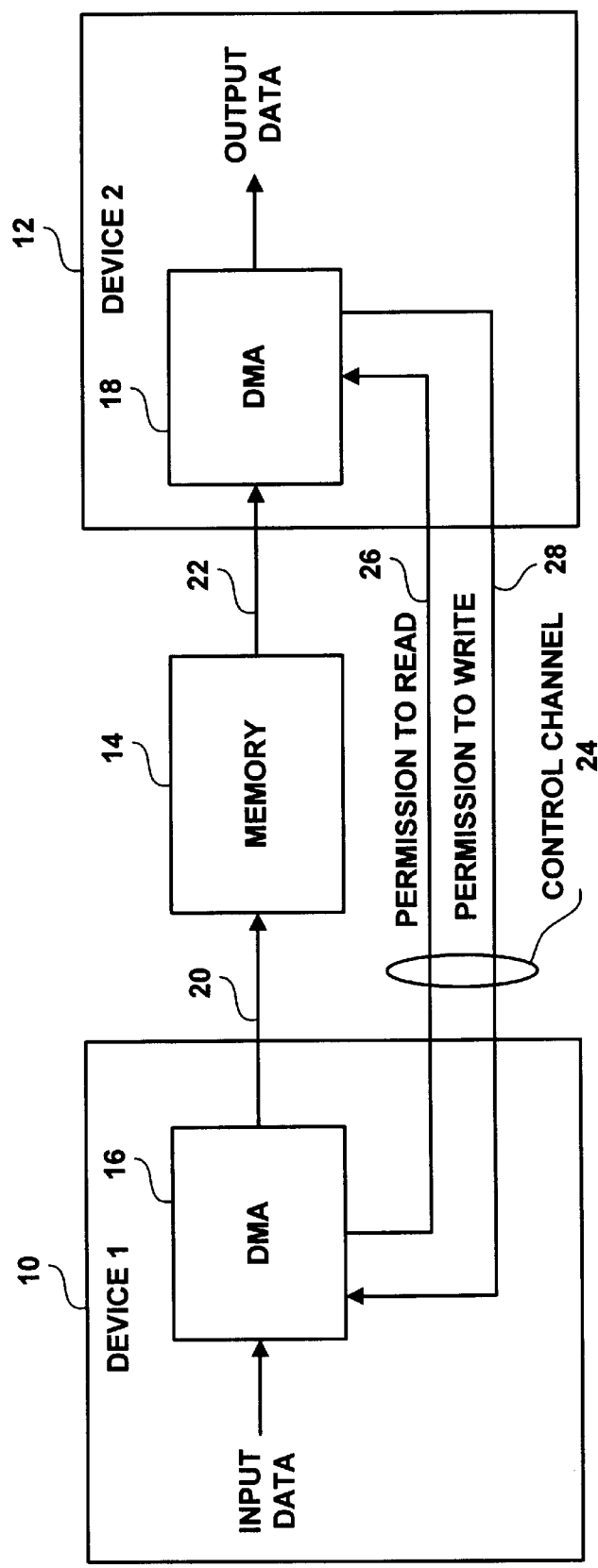
FIG. 1 is a block diagram illustrating two devices which share data through a memory and which communicate through a control channel.

FIG. 1 illustrates a system in which devices are connected by a memory to communicate data from one device to the other. In this interconnect, a first device 10 is connected to a second device 12 through a memory 14. The first device 10 outputs data to the memory, for example by using a direct memory access (DMA) engine. The second device 12 reads data from the memory 14, for example by using a direct memory access (DMA) engine 18. The bus 20 connecting DMA engine 16 to the memory 14 and the bus 22 connecting the memory 14 to the DMA engine 18 may be any kind of data bus. For example, the bus 22 may connect host memory of a computer to devices 10 and 12 connected to the bus. An additional channel called a control channel 24 provides a bidirectional connection from DMA device 16 to DMA device 18. The DMA engine 16 of the sending device 10 sends a signal to the DMA engine 18 of the receiving device 12 as indicated at 26. This signal provides an indication that the DMA engine 18 may read data from the memory 14 and may be considered a "permission to read" signal. The DMA engine 18 of the receiving device 12 sends a signal 28 to DMA engine 16. The signal provides an indication that the DMA engine 16 may write more data to the memory 14 and may be considered a "permission to read acknowledged" or "permission to write" signal.

DMA engine 16 keeps track of the amount and location of available space in memory 14. The DMA engine 16 may write data to the memory 14 until the memory is full. The DMA engine 18 keeps track of the amount and location of valid data available in memory 14 and may read data until no data is available in memory 14. Although this description refers to a DMA engine, any other kind of memory controller also may be used.

The communication of the availability of valid data in memory 14 from the DMA engine 16 to DMA engine 18 may be performed over the control channel in several ways. For example, the DMA engine 16 may identify memory locations or ranges of memory locations which contain valid data. Alternatively, the DMA engine 16 may treat the memory 14 as a circular buffer. When the memory is a circular buffer, the DMA engine 16 may send the last address to which it has written data (a write limit pointer) to the DMA engine 18. The DMA engine 18 limits any read operation to those addresses up to and including the write limit pointer sent by DMA engine 16. DMA engine 18 also returns the address at which it stops reading (a read limit pointer). The DMA engine 16 limits any write operation to those addresses up to and including this read limit pointer. Alternatively, the DMA engines 16 and 18 may communicate an amount of data, such as a number of components of video data, written to or read from the memory 14. By tracking the size of the memory 14 and the amounts of data written to and read from the memory 14, the DMA devices 16 and 18 actually may use different memory address maps to access memory 14 and may communicate indirect addresses.

Figure 2:
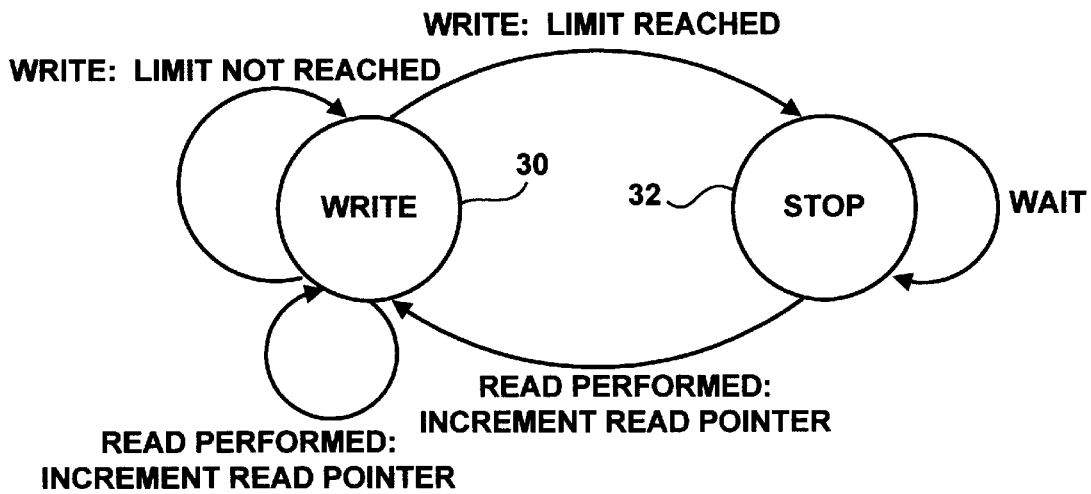
FIG. 2 is a state diagram of a flow control mechanism of a sender of data in FIG. 1.

A state diagram of a sender for controlling flow of data to a receiver is shown in FIG. 2. The sender typically has two states. In write state 30, data is written by the sender to the memory 14. The write state generally is an initial state if the memory is empty. When the sender 10 writes data to the memory 14, the sender also sends an indication of the amount of data written to the memory to the receiver. In stop state 32, data is not written. In the write state 30, the sender transitions to stop state 32 and writing is stopped, for example, when the read limit pointer of the memory is reached. This limit may be determined from the flow control information received from the receiver over the control channel. If the sender tracks read and write pointers and if the write pointer is greater than the read pointer, then the difference between the size of the available memory and the difference between the read and write pointers may be used to compute the available amount of memory space. If the read pointer is greater than the write pointer, the difference between the read and write pointer indicates the amount of available memory. When the memory space is full, the write limit is reached and writing stops. In the stop state, if the read pointer is incremented in response to flow control information from the receiver, a transition back to the write state occurs. In the write state, if the read pointer is incremented, the sender remains in the write state 30. If a write operation occurs and the write limit is not reached, the sender also remains in the write state 30.

Figure 3:
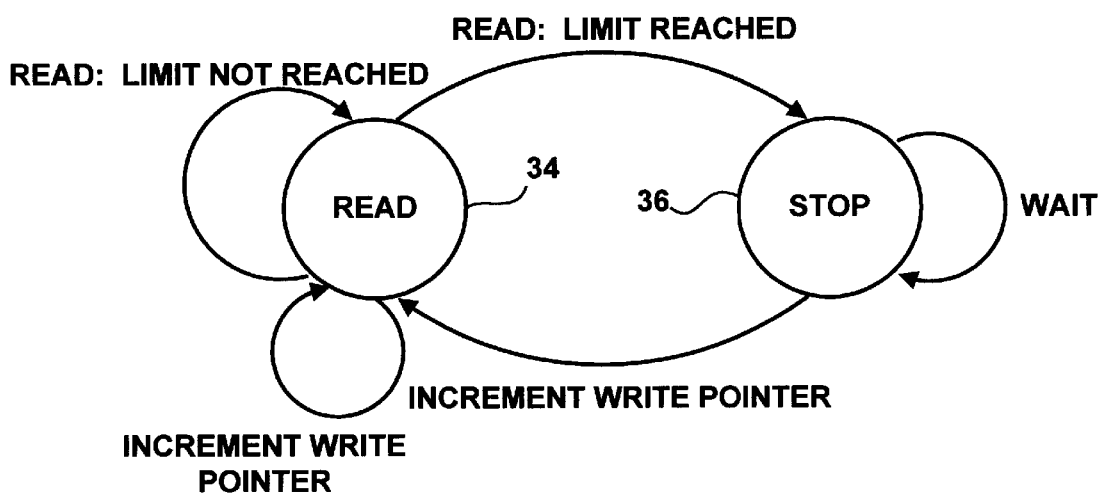
FIG. 3 is a state diagram of flow control performed by a receiver of data.

A state diagram of a receiver for controlling flow of data from a sender is shown in FIG. 3. The receiver has a read state 34 and a stop state 36. If no data is available in the memory 14, the receiver is in the stop state 36, which is generally an initial state. The receiver stays in this state until data becomes available, as indicated by the sender by flow control information sent over the control channel. A transition to the read state 34 occurs when data becomes available. For example, a write pointer may be incremented by receipt of flow control information from the sender to indicate availability of data. The receiver remains in the read state 34 until the memory is empty, which may be determined, for example by using a read limit pointer. In other words, if the write pointer is incremented in read state 34, the receiver remains in read state 34. If a read operation is performed and the read limit is not reached, the receiver also remains in read state 34. When the read limit is reached, a transitions occurs from the reading state 34 to the stop state 36. The receiver may track a read pointer and a write pointer similar to the sender. The read pointer is incremented every time data is read from the memory 14. The write pointer is incremented in response to signal 26 from the sender.

Using a system such as shown in FIGS. 1 through 3, the control channel 24 connects the sender and receiver together in order to communicate control information without complex interface design. The control channel may use a bus architecture, such as PCI, when DMA devices in the sender and receiver are physically separate but in the same system. A dedicated interconnect also may be used for the control channel.

Figure 4:
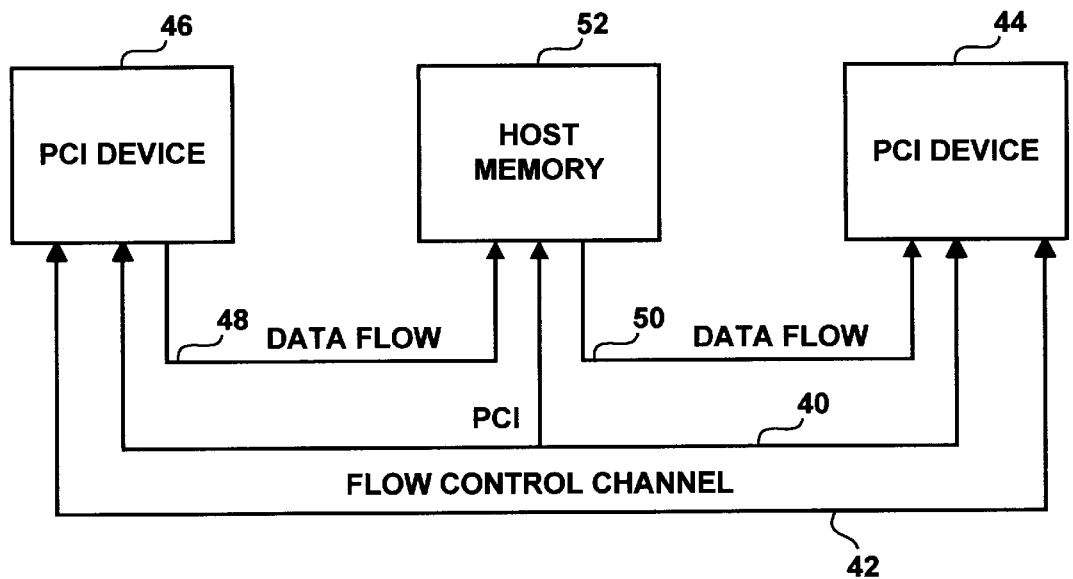
FIG. 4 is a block diagram of one embodiment in which a host memory of the computer connects two devices.

Referring now to FIG. 4, in one embodiment, a peripheral component interconnect (PCI) bus 40 implements both a control channel 42 between separate PCI devices 44 and 46 and data channels 48 and 50 to host memory 52 in a host computer system. A host computer system typically has a processor, input devices and output devices connected to the host memory to execute application programs. A similar design may be constructed using a computer system with an advanced (or accelerated) graphics port (AGP) bus. In this system, a PCI device 46 writes data to host memory 52 over the PCI bus 40. PCI device 44 reads data from the host memory 52 over the PCI bus 40. PCI devices 44 and 46 communicate control information directly to each other over the PCI bus 40 or through any other channel. One advantage of this construction is that the PCI devices may use host memory both for a switch for directing data and as a flow controlled buffer between the devices.

Figure 5:
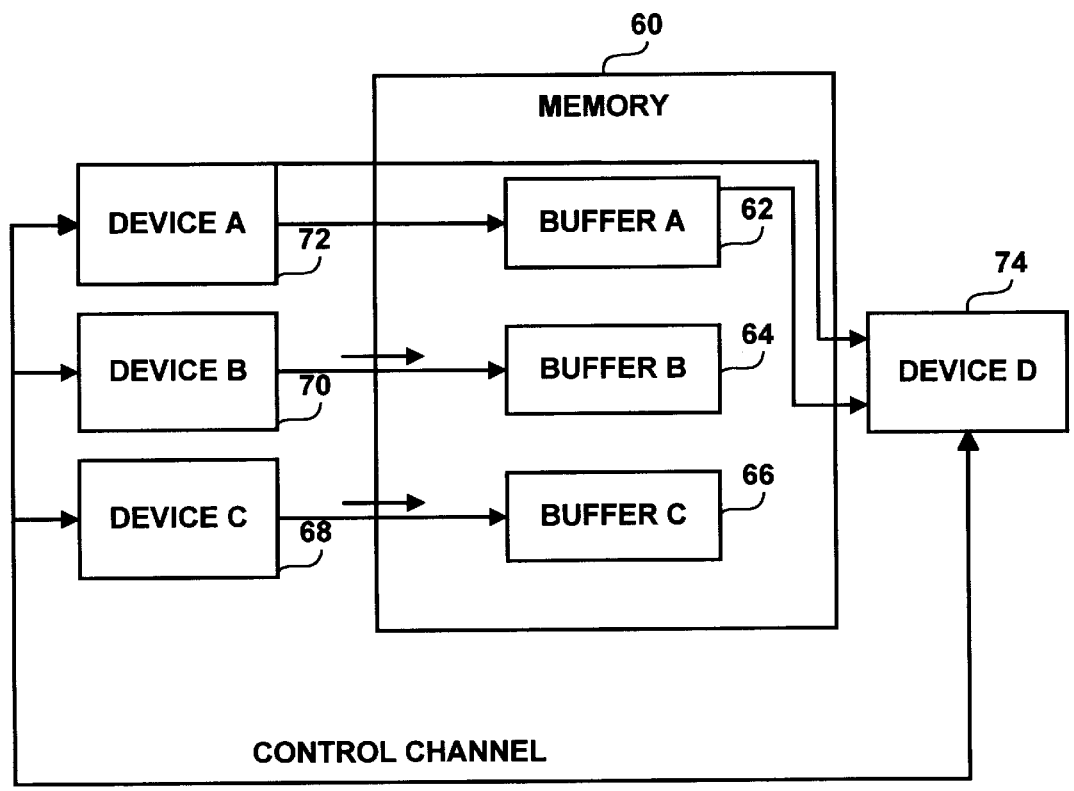
FIG. 5 is a block diagram of one embodiment in which the control channel communicates a buffer address to provide switching capability.

An example embodiment of a system which permits switching through a memory in a flow controlled manner is shown in FIG. 5. This system includes a memory 60 which has three buffers 62, 64 and 66. A first sending device 68 sends data to buffer 66. A second sending device 70 sends data to buffer 64. A third sending device 72 sends data to buffer 62. The receiving device 74 may read data from any of the buffers 62, 64 and 66. In this figure, receiving device 74 is shown receiving data from sending device 72 through buffer 62. The sending devices 68, 70 and 72 send flow control information over a flow control channel 76 to the receiving device 74. The receiving device 74 sends flow control information back to any of the sending devices 68, 70 and 72 over control channel 76 according to the buffer from which it reads the data. If the memory 60 is host memory and the devices 68, 70, 72 and 74 are PCI devices, this system uses host memory as a flow controlled switch among the PCI devices.

The control channel also may communicate auxiliary switching information between connected DMA devices. This auxiliary switching information permits remote devices to implement dynamic packet switching through memory. Such auxiliary switching information may include the starting address of the data buffer and memory, the buffer size and configuration, and the source address of the device connection at the destination end. The auxiliary information may include a memory address into which data is to be written or a device address to which data should be routed. There are several other ways to communicate the auxiliary information. In one embodiment, a packet protocol such as described in U.S. Patent Application entitled "A Packet Protocol for Encoding and Decoding Video Data and Data Flow Signals and Devices for Implementing the Packet Protocol," filed Apr. 3, 1998 by Craig R. Frink and Andrew V. Hoar, which is hereby incorporated by reference, may be used to transfer command data in packets over the control channel.

By providing a system in which devices are connected by a memory in combination with the separate control channel, as described above, the flow of data between the devices through the memory may be controlled by the receiver. This control of the flow of data helps to reduce transfer latency and to manage the flow of data among devices among where data flow may occur at irregular rates. Multiple devices interconnected by the memory may use the memory as a switch. The memory also may be used to combine data received into a congruent sequence or may output one copy of data to several destinations.

Having now described a few embodiments, it should be apparent to those skilled in the art that the foregoing is merely illustrative and not limiting, having been presented by way of example only. Numerous modifications and other embodiments are within the scope of the invention.

What is claimed is:

1. An apparatus for communicating data between a first device and a second device, comprising;
   in the first device, a first memory controller which writes data into a memory,
   in the second device, a second memory controller which reads data from the memory;
   a control channel for communicating from the first device to the second device an indication of an amount of data written into the memory by the first memory controller and for communicating from the second device to the first device an indication of the amount of data read from the memory by the second memory controller; and
   wherein the second memory controller reads data from the memory until the memory is empty as determined by the indicated amount of data written to the memory by the first memory controller and the amount of data read from the memory by the second memory controller;
   a third device having a third memory controller and connected to write data to the memory and a second control channel for communicating from the third device to the second device an indication of an amount of data written into the memory by the third memory controller and for communicating from the second device to the third device an indication of the amount of data read from the memory by the second memory controller;
   wherein the first device and the third device write data to separate portions of the memory; and
   wherein the second memory controller reads data from the memory for the third device until the memory for the third device is empty as determined by the indicated amount of data written to the memory by the third memory controller and the amount of data read from the 30 memory for the third device by the second memory controller.

2. The apparatus of claim 1, wherein the first memory controller writes data to the memory until the memory is full as determined by the indicated amount of data written to the memory by the first memory controller and the amount of data read from the memory by the second memory controller.

3. The apparatus of claim 1, wherein the third memory controller writes data to the memory until the memory for the third device is full as determined by the indicated amount of data written to the memory by the third memory controller and the amount of data read from the memory for the third device by the second memory controller.

4. The apparatus of claim 3, further comprising a fourth device having a fourth memory controller and connected to read data to the memory and a third control channel for communicating from the first device to the fourth device an indication of an amount of data written into the memory by the first memory controller and for communicating from the fourth device to the first device an indication of the amount of data read from the memory by the fourth memory controller;
   wherein the second device and the fourth device read data from separate portions of the memory; and
   wherein the fourth memory controller reads data from the memory for the fourth device until the memory for the fourth device is empty as determined by the indicated amount of data written to the memory for the fourth device by the first memory controller and the amount of data read from the memory for the fourth device by the fourth memory controller.

5. The apparatus of claim 4, wherein the first memory controller writes data to the memory until the memory for the fourth device is full as determined by the indicated amount of data written to the memory by the first memory controller and the amount of data read from the memory for the fourth device by the fourth memory controller.

6. The apparatus of claim 1, wherein the first device is a first video processing device and the second device is a second video processing device and the data is video data.

7. The apparatus of claim 5, further comprising a fourth control channel for communicating from the third device to the fourth device an indication of an amount of data written into the memory by the third memory controller and for communicating from the fourth device to the third device an indication of the amount of data read from the memory by the fourth memory controller;
   wherein the fourth memory controller reads data from the memory for the fourth device until the memory for the fourth device is empty as determined by the indicated amount of data written to the memory for the fourth device by the third memory controller and the amount of data read from the memory for the fourth device by the fourth memory controller.

8. The apparatus of claim 7, wherein the third memory controller writes data to the memory until the memory for the fourth device is full as determined by the indicated amount of data written to the memory by the third memory controller and the amount of data read from the memory for the fourth device by the fourth memory controller.

9. An apparatus for communicating data between a first device and a second device, comprising;
   in the first device, a first memory controller which writes data into a memory,
   in the second device, a second memory controller which reads data from the memory;
   a control channel for communicating from the first device to the second device an indication of an amount of data written into the memory by the first memory controller and for communicating from the second device to the first device an indication of the amount of data read from the memory by the second memory controller; and wherein the second memory controller reads data from the memory until the memory is empty as determined by the indicated amount of data written to the memory by the first memory controller and the amount of data read from the memory by the second memory controller;

a third device having a third memory controller and connected to read data to the memory and a second control channel for communicating from the first device to the third device an indication of an amount of data written into the memory by the first memory controller and for communicating from the third device to the first device an indication of the amount of data read from the memory by the third memory controller;

wherein the second device and the third device read data from separate portions of the memory; and wherein the third memory controller reads data from the memory for the third device until the memory for the third device is empty as determined by the indicated amount of data written to the memory for the third device by the first memory controller and the amount of data read from the memory for the third device by the third memory controller.

10. The apparatus of claim 9, wherein the first memory controller writes data to the memory until the memory for the third device is full as determined by the indicated amount of data written to the memory by the first memory controller and the amount of data read from the memory for the third device by the third memory controller.

* * * * *